US006423923B1

(12) United States Patent
Siniaguine

(10) Patent No.: US 6,423,923 B1
(45) Date of Patent: Jul. 23, 2002

(54) MONITORING AND CONTROLLING SEPARATE PLASMA JETS TO ACHIEVE DESIRED PROPERTIES IN A COMBINED STREAM

(75) Inventor: Oleg Siniaguine, San Jose, CA (US)

(73) Assignee: Tru-Si Technologies, Inc., Sunnyvale, CA (US)

(*) Notice: Subject to any disclaimer, the term of this patent is extended or adjusted under 35 U.S.C. 154(b) by 0 days.

(21) Appl. No.: 09/632,485

(22) Filed: Aug. 4, 2000

(51) Int. Cl.[7] .............................................. B23K 10/00

(52) U.S. Cl. .............................. 219/121.59; 219/121.5; 315/111.51

(58) Field of Search ....................... 219/121.59, 121.51, 219/121.47, 121.48, 76.16, 121.36, 121.11, 121.5; 315/111.21, 111.41, 111.51; 427/8; 373/18

(56) References Cited

U.S. PATENT DOCUMENTS 3,786,306 A 1/1974 Schoumaker ............... 315/111
3,916,034 A 10/1975 Tsuchimoto ................. 427/38
4,009,413 A 2/1977 Elliott et al. ............. 315/111.2
4,341,941 A 7/1982 Tateno ........................ 219/121
4,390,773 A 6/1983 Esser et al. ................. 219/121
4,656,331 A 4/1987 Lillquist et al. ............ 219/121
4,812,166 A 3/1989 Saiki et al. .................... 75/0.5
4,982,067 A 1/1991 Marantz et al. ........ 219/121.47
5,062,708 A 11/1991 Liang et al. ................ 356/316
5,474,642 A 12/1995 Zorina et al. ............... 156/345
5,489,820 A 2/1996 Ivanov et al. ........... 315/111.51
5,539,176 A * 7/1996 Ikegaya et al. ........ 219/121.59
5,562,841 A * 10/1996 Kulik et al. ........... 219/121.59
5,767,627 A 6/1998 Siniaguine ............. 315/111.41
6,040,548 A * 3/2000 Siniaguine ............. 219/121.48
6,084,203 A 7/2000 Bonigen ................ 219/121.63
6,184,060 B1 2/2001 Siniaguine .................. 438/106

FOREIGN PATENT DOCUMENTS

| | | | |
|---|---|---|---|
| EP | 0 807 964 A1 | 11/1995 |
| RU | 2032281 | 3/1995 |
| WO | WO 92/12273 | 7/1992 |
| WO | WO 92/12610 | 7/1992 |
| WO | WO 93/16573 | 8/1993 |
| WO | WO 96/21943 | 7/1996 |
| WO | WO 96/23394 | 8/1996 |
| WO | WO 96/32742 | 10/1996 |

OTHER PUBLICATIONS

Russian Article from Book "Equipment For High Efficiency Technologies", Ministry of Electro–Technique, Scientific & Production Association "ROTOR", Cherkassi, USSR, 1990 (pp. 72–78) with English Translation (6 pages).

Patents Abstracts of Japan, vol. 1995 No. 10, Nov. 30, 1995 & JP 07 185855 A (Nissan Motor Co Ltd), Jul. 25, 1995, abstract (1 page).

Database WPI, Section Ch, Week 19941, Derwent Publications Ltd., London, GB; Class E33, An 1991–301805, XP002187296 & SU 1 624 708 A (Lengd Basic Chem), Jan. 30, 1991, abstract (1 page).

* cited by examiner

*Primary Examiner*—Teresa Walberg
*Assistant Examiner*—Quang Van
(74) *Attorney, Agent, or Firm*—Skjerven Morill LLP; Michael Shenker; David T. Millers

(57) ABSTRACT

A plasma apparatus separately measures multiple plasma jets upstream of where the plasma jets converge into a combined plasma stream. The separate plasma jets can be separately adjusted to place the separate jets in a configuration that provides the combined stream with desired properties for a plasma treatment. The system can include an injector for a neutral jet that becomes part of the combined plasma stream. With an injector, the positions of the plasma jets can be measured relative to the injector so that the plasma jets and the neutral jet are properly aligned to form a combine plasma stream having the properties desired.

17 Claims, 5 Drawing Sheets

MONITORING AND CONTROLLING SEPARATE PLASMA JETS TO ACHIEVE DESIRED PROPERTIES IN A COMBINED STREAM

BACKGROUND

1. Field of the Invention

This invention relates to plasma treatment equipment.

2. Description of Related Art

Manufacturers of integrated circuit devices commonly employ plasma treatment equipment. Such equipment generates a plasma containing reactants and then exposes a surface of a semiconductor wafer to the plasma reactants. Plasma reactants can etch away portions of a wafer exposed by a mask to form a patterned structure or remove layers of a wafer to thin the wafer. During such etching, the rate and uniformity of the etching process need to be within expected ranges. Otherwise, defects may result from overetching or underetching portions of the integrated circuits being manufactured.

One type of plasma treatment system generates a plasma stream that can be directed at an object being treated. U.S. Pat. No. 5,474,642 describes a plasma treatment system that uses a single jet from a plasma burner to form a plasma stream directed at a wafer. However, greater flexibility and uniformity may be achieved in a system that combines a pair of plasma jets to form a combined plasma stream. This type of plasma treatment equipment is described in U.S. Pat. No. 5,489,820 and an article entitled "Apparatus for Plasma Flow Monitoring" at pages 72–78 in the book entitled "Equipment for High Efficiency Technologies," Scientific & Production Association "ROTOR", Cherkassi, USSR (1990). (The previously quoted article and book titles are translations of Russian titles.) In such systems, the direction, cross-section, energy profile, and composition of the combined plasma stream need to be within desired limits for a particular treatment. However, environmental factors such as magnetic fields, gas flows and movement of the objects being treated and deterioration or variations in the operating parameters of the plasma burners tend to shift the paths or directions of the plasma jets. These factors are difficult to predict or directly control. Accordingly, known plasma treatment systems have monitored the combined plasma stream and attempted to adjust the input parameters to keep the combined plasma stream within required limits.

FIG. 1 shows plasma equipment such as described in U.S. Pat. No. 5,489,820. That equipment includes two plasma generators or burners 1, an electric drive 3, magnetic circuits 4, solenoids 5, a power supply 6, gas supply systems 7 and 8, a recording unit 9, and a processing unit 10. Supply systems 7 and 8 provide gases to plasma burners 1, and from the gases, plasma burners 1 produce two separate plasma jets. The plasma jets converge to form a combined plasma stream 2. Electric drive 3, on which plasma burners 1 are mounted, permits adjustment of the separation and the angle between burners 1 to thereby adjust the paths of the plasma jets. The solenoids 5 and magnetic circuits 4, associated with burners 1, provide magnetic fields for further adjustment of plasma jets. In particular, power supply 6 under control of processing unit 10 supplies current to solenoids 5 to adjust the plasma jets that form combined plasma stream 2. Recording unit 9 measures a property of combined plasma stream 2, and based on the measurements from recording unit 9, processing unit 10 determines appropriate settings for electric drive 3, power supply 6, and gas supply systems 7 and 8. Further description of the elements in FIG. 1 can be found in U.S. Pat. No. 5,489,820, which is hereby incorporated by reference in its entirety.

A disadvantage of the system of FIG. 1 is the need to identify the appropriate system settings based on the combined plasma stream 2. In particular, a deviation in plasma stream 2 might arise from a number of different factors, and choosing an appropriate setting to correct the deviation may be difficult. These difficulties increase with the number of inputs to the combined plasma stream. Additionally, if reactants from a cold stream are added to the combined plasma stream, the reactants can disturb the shape of the combined plasma beam and upon becoming a plasma may glow much more brightly that the plasma from the original jets. Accordingly, addition of cold jets makes it difficult to identify the properties of the original jets from measurements of the combined plasma stream. Plasma equipment is needed that is able to configure multiple input systems to provide a consistent plasma stream despite variations in environmental factors and variations in operating parameters.

SUMMARY

In accordance with an aspect of the invention, a plasma treatment system separately measures input plasma jets before the plasma jets merge into a combined stream. One embodiment of the invention measures the position of plasma jets in a plane upstream of where the jets merge into the combined stream. The positions are measured relative to a fixed reference, and particularly in a system that combines plasma jets with a cold jet, the positions of the plasma jets are measured relative to the injector of the cold jet. Since the plasma jets are directly measured the plasma jets can be more easily steered into the proper paths that provide a combined stream with the desired properties.

One advantage of monitoring the positions of the individual plasma jets and not the combined plasma stream is that the individual jets have structures that are simpler than the structure of the combined plasma stream. For example, the brightness distribution of the total plasma stream typically has a "double-hump" curve, with one hump contributed by each jet. The brightness distribution of the total plasma stream and hence monitoring and controlling of the combined stream are thus more complicated than for a single jet. Further, separate measurement of jets facilitates injection of a reagent into the combined plasma stream at a point where the jets merge into the combined plasma stream. The reagent affects the temperature of the total plasma stream, and may change the brightness distribution, ion concentration, spectral radiation factors, and heat flow. The reagent (i.e., the cold jet) also interacts with the jets aerodynamically, changing the cross-sectional dimension of the total plasma stream. With or without the reagent, the brightness distribution, the ion concentration, the spectral radiation factors, the heat flow, and the cross-sectional dimension of the total plasma stream are more difficult to control than are the positions of the separate jets.

One specific embodiment of the invention is a plasma apparatus that includes first and second plasma burners, a measurement system, and a processing and control system. The first plasma burner generates a first plasma jet. The second plasma burner that generates a second plasma jet that is directed to join with the first plasma jet in a combined stream. The measurement system is positioned to separately measure the first plasma jet and the second plasma jet. In operation, the processing and control system determines at least one characteristic such as the position, cross-section, energy, or composition of the first plasma jet and a similar characteristic of the second plasma jet. Based on those determinations, the processing and control system adjusts the first and second plasma jets so that the characteristics of the first and second jet match predetermined characteristics that provide the combined stream with desired properties.

The measurement system can include a first camera and a second camera for stereoscopic imaging of the plasma jets. Each camera has a field of view that includes one or more plasma jets. When two jets are in the field of view of a camera, the camera is position such that throughout the expected range of motion of the plasma jets, an image of one jet remains on one side of a reference point and an image of a second jet remains on the other side of the reference point. The reference point can correspond to an injector of a cold jet so that the plasma jets and the cold jet have desired relative orientations.

Another embodiment of the invention is a method for operating a plasma apparatus that uses first and second plasma jets that converge into a combined plasma stream. The method includes: separately measuring characteristics such as the positions of the first and second plasma jets; and adjusting the first and second plasma jets so that the characteristics of the first and second plasma jets go from the values measured to values previously determined to provide the combined plasma stream with desired properties. When separately measuring the characteristics of the first and second plasma jets identifies the positions of the first and second plasma jets, adjusting the first and second plasma jets includes shifting the first and second plasma jets from the measured positions to positions previously determined to provide the combined plasma stream with the desired properties.

A structure such as an injector of a cold jet can define a reference point for measurement of the separate jets. In one embodiment of the invention, a calibration process mounts a fixture on an injector. The injector is below the field of view of the measurement system but the fixture extends into a field of view of the measurement system. For example, when the measurement system employs cameras, the fixture is mounted on the injector and directs one or more light beams at each camera. The cameras in turn identify the position of the beams and infer the relative position that the cold jet will have during operation of the plasma treatment system. The fixture is then removed for operation of the plasma treatment system.

BRIEF DESCRIPTION OF THE DRAWINGS

Use of the same reference symbols in different figures indicates similar or identical items.

DETAILED DESCRIPTION

In accordance with an aspect of the invention, plasma jets are separately measured upstream of where the plasma jets merge into a combined stream. The measurement directly determines a characteristic such as the position and cross-section of each plasma jet. The direct measurement of each plasma jet simplifies separate adjustment of the individual plasma jets. In particular, each jet is adjusted so that the jet has characteristics that were previously determined to provide a combined plasma stream having the desired properties.

Figure 1:
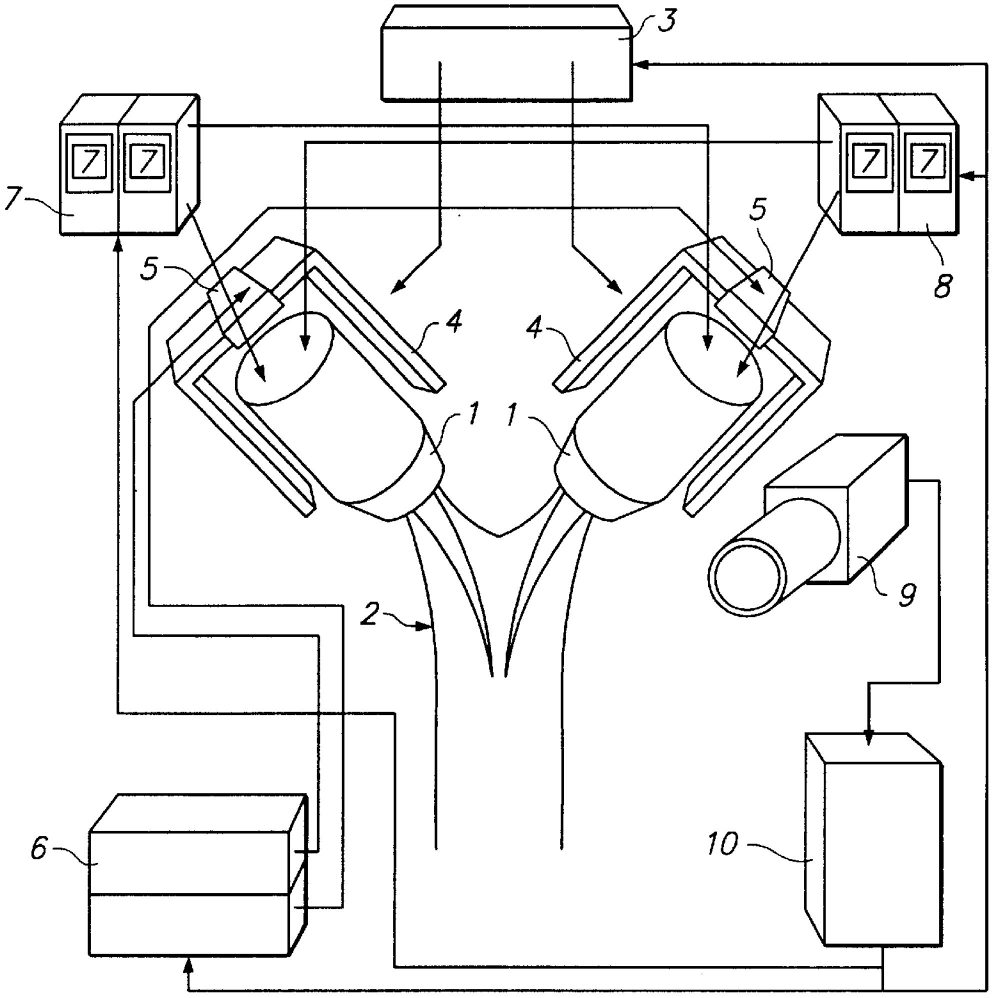
FIG. 1 (PRIOR ART)
FIG. 1 shows a known plasma treatment system.
Figure 2:
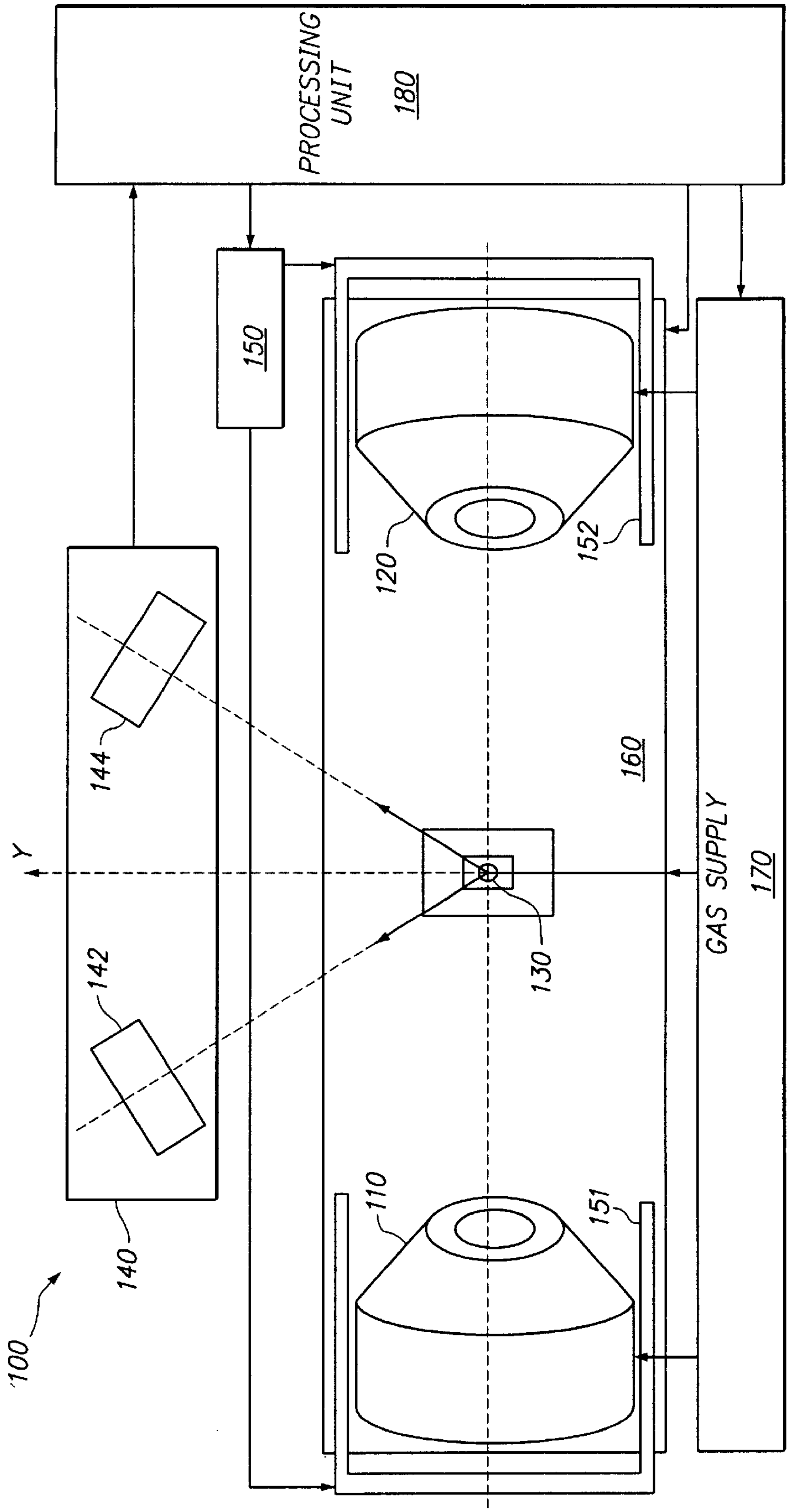
FIG. 2 shows a plasma treatment system in accordance with an embodiment of the invention.

FIG. 2 shows a simplified plan view of a plasma treatment system 100 in accordance with an embodiment of the invention. Plasma treatment system 100 includes two plasma burners 110 and 120, an injector 130, and a measurement system 140. Each of plasma burners 110 and 120 receives an input gas from a gas supply 170 and creates a plasma jet from the gas received. The chemical compositions of the plasma jets depend on the input gases, and the chemical composition of the plasma jet exiting from burner 110 could differ from the chemical composition of the plasma jet exiting from burner 120. In an exemplary embodiment of the invention, the plasma from each of burners 110 and 120 consists of an inert gas such as argon.

Plasma burners such as burners 110 and 120 are well known in the art, and burners 110 and 120 can be of known or yet to be developed type. However, in the exemplary embodiment of the invention, each burner 110 and 120 has a configuration such as described in U.S. patent application Ser. No. 09/465,989, by O. Siniaguine and P. Halahn, entitled "Plasma Generator Ignition Circuit" (now U.S. Pat. No. 6,121,571, issued on Sep. 19, 2000) and/or U.S. patent application Ser. No. 09/457,043, by O. Siniaguine, entitled "Electrode for Plasma Generator", which are hereby incorporated by reference in their entirety. A suitable system for use of the burners is further described in U.S. Pat. No. 5,767,627, by O. Siniaguine entitled "Plasma Generation And Plasma Processing Of Materials", which is hereby incorporated by reference in its entirety.

A processing unit 180 operates control mechanisms in plasma treatment system 100 and thereby controls the paths of the jets from plasma burners 110 and 120. In particular, plasma burners 110 and 120 are mounted on a drive system 160, and processing unit 180 controls drive system 160 to separately set the position and orientation of each burner 110 and 120. Additionally, plasma burners 110 and 120 have respective magnetic systems 151 and 152 that generate magnetic fields for control of the plasma jets from plasma burners 110 and 120. A power supply 150, under direction of processing unit 180, supplies electric currents to magnetic systems 151 and 152 to adjust the plasma jets. Processing unit 180 can also control gas supply 170 to control gas mixtures and flow rates provided to plasma burners 110 and 120 and injector 130.

Injector 130 generates a cold jet that merges with the plasma jets from burners 110 and 120 and becomes part of a combined plasma stream. The jet from nozzle 130 can include chemically reactive gases or an aerosol or powder that might erode the electrodes in plasma burner 110 or 120 if converted into plasma inside burner 110 or 120. The jet from nozzle 130 is not a plasma (i.e., does not contain a significant concentration of separated charged particles) and is typically invisible or is otherwise difficult to measure without disturbing the jet.

Measurement system 140 separately measures the characteristics of the plasma jets from plasma burners 110 and 120. In the illustrated embodiment, measurement system 140 includes a pair of cameras 142 and 144 for stereoscopic measurements of the plasma jets. In particular, the plasma jets give off light that cameras 142 and 144 measure. Cameras 142 and 144 forward image data (e.g., intensity and spectral information for regions including the plasma jets) to processing unit 180. Since cameras 142 and 144 have different perspectives in imaging of the plasma jets, processing unit 180, using software implementing conventional triangulation techniques, can identify the position of each plasma jet. In the exemplary embodiment, processing unit 180 is a personal computer with interface circuitry for receiving data from cameras 142 and 144 and suitable software to process the data and determine characteristics (e.g., the positions) of the separate plasma jets.

The cold jet from injector 130 typically does not appear in the images taken by cameras 142 and 144 because a cold, neutral gas jet is likely transparent to the frequencies of light that cameras 142 and 144 sense. However, neutral jets have more predictable paths since, unlike plasma jets, neutral jets are unaffected by electromagnetic fields of ordinvary magnitudes. Accordingly, the location of injector 130 provides a reference indicating the position and orientation of the jet from injector 130, and consistent positioning the plasma jets relative to the injector 130 provides consistent characteristics in the combined plasma stream.

In the exemplary embodiment of the invention, injector 130 is not in the field of view of measurement system 140, and as described below, a light fixture is mounted on injector 130 during a calibration operation that locates a reference point based on the position of injector 130. In an alternative embodiment, injector 130 extends into the field of view of measurement system 140 and can be directly observed. To simplify identification of injector 130, injector 130 can be coated with a reflective or absorptive material to provide high image contrast, and cameras 142 and 144 can image injector 130 before plasma burners 110 and 120 begin generating plasma jets.

Figure 3A:
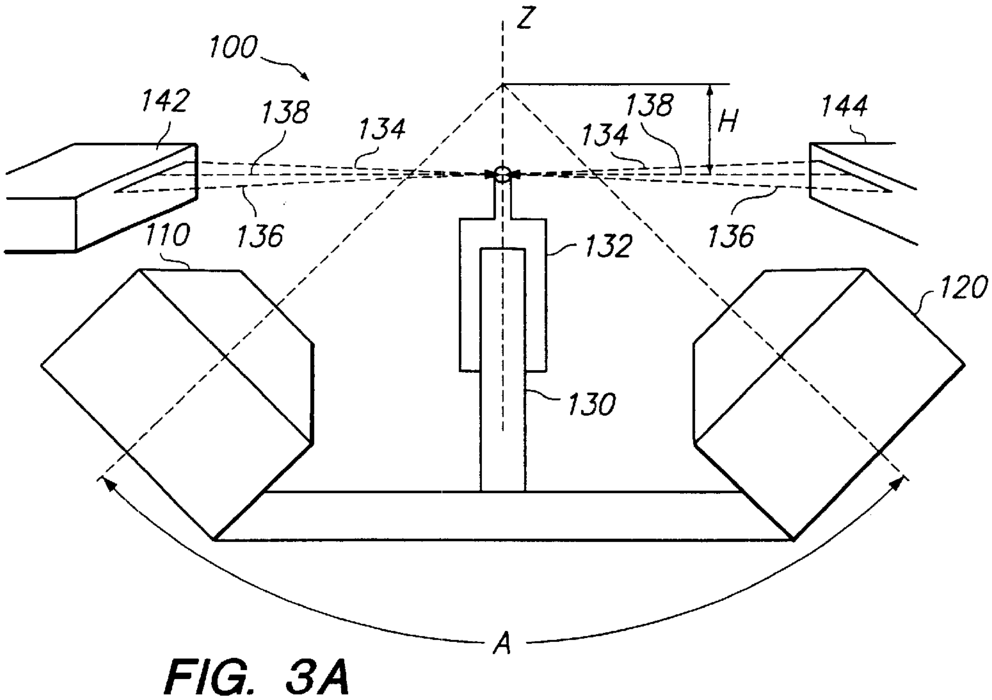
FIGS. 3A and 3B are side views of the plasma treatment system of FIG. 2 and respectively illustrate use of a light fixture and measurement of the paths of plasma jets that merge to form a combined stream.

FIG. 3A shows a side view of the exemplary embodiment of plasma treatment system 100 during a calibration operation. In FIG. 3A, cameras 142 and 144 have a view plane that is a distance H upstream of the intersection of the axes of plasma burners 110 and 120. The tip of injector 130 is below the view plane of cameras 142 and 144. For the calibration operation, a light fixture 132 is placed on injector 130 and directs one or more light beams to cameras 142 and 144. In the exemplary embodiment, the fixture directs three beams 134, 136, and 138 at each of cameras 142 and 144. Beam 138 originates from directly above a center point of injector 130. Processing unit 180 identifies the position of beam 138 in an image and uses that position in the image as a reference point indicating the position of the cold jet from injector 130. Beams 134 and 136 are offset from beam 138 and define the view plane. Accordingly, cameras 142 and 144 can be adjusted or calibrated so that all of beams 134, 136, and 138 lie in the view plane. After calibration of cameras 142 and 144 and identification of reference points corresponding to the position of the cold jet, fixture 132 is removed from injector 130.

In the exemplary embodiment of the invention, cameras 142 and 142 are scan line cameras and are oriented with optical axes that intersect at a right angle. Suitable commercially-available CCD cameras can be employed. In the exemplary embodiment, the optical system of each camera uses a pin hole, which is durable and provides adequate image quality. Light fixture 132 for this exemplary embodiment includes a fiber-optic light source, a semitransparent element (e.g., a half-silvered mirror), and a mounting that matches injector 130. Injector 130 can be shaped (e.g., rectangular) so that placing the light fixture on injector 130 automatically aligns the light fixture for a calibration operation. The fiber optic light source directs three parallel light beams through the semitransparent element directly at camera 142 or 144. The center beam passes directly over the center of injector 130 so that identification of the center beam indicates the reference point for placement of the plasma jets. The outer beams define the desired view plane for adjustment of camera orientations. The semitransparent element is at an angle (e.g., 45°) with the incident direction of the light beams and partially reflects the three light beams toward camera 144 or 142. The semitransparent element passes directly over the center of injector 130 so that the reflected center beam originates directly over the center of injector 130 and indicates the location of a reference point.

The use of a reference point corresponding to the injector permits proper positioning of plasma jets relative to a cold jet, which is otherwise difficult to observe during a plasma treatment. However, this aspect of the invention is not limited to use in a system that separately measures input plasma jets. In particular, the position of a combined plasma stream can be measured relative to the position of the injector to achieve a combination of the cold jet and plasma jets with the desired characteristics for the treatment. A fixture as described above can be modified to extend into a region in which a combined plasma stream is measured.

Figure 3B:
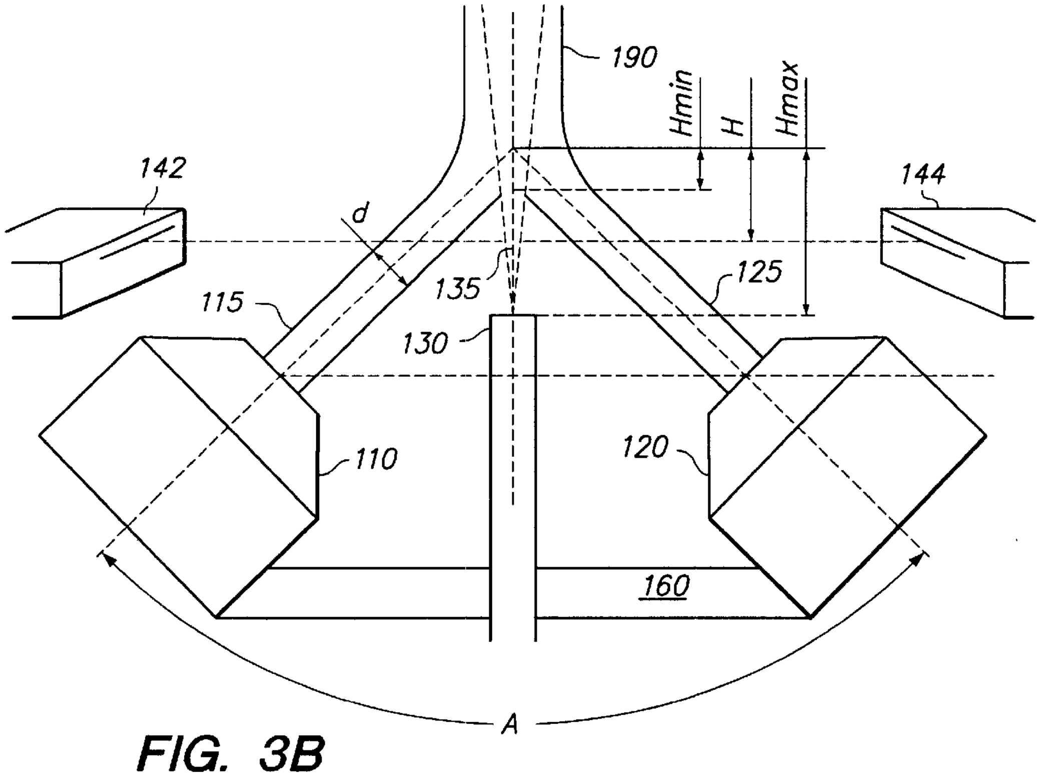

FIG. 3B shows plasma burners 110 and 120 and injector 130 in a relative configuration where respective jets 115, 125, and 135 have predetermined characteristics that are known to provide a combined plasma stream 190 having the desired properties for a particular plasma treatment. Characteristics of jets 115, 125, and 135 that are important to achieving the desired, combined plasma stream 190 include the paths, cross-sections, chemical composition, and energy profile of the plasma jets. An advantageous aspect of the present invention is that the paths of plasma jets 115 and 125 are accurately positioned relative to cold jet 135. The particular jet characteristics needed for a particular plasma treatment can be determined during design, manufacture, or calibration of plasma treatment equipment 100. The particular system parameters (e.g., the orientations of burners 110 and 120 and injector 130) that achieve the predetermined jet characteristics may differ in different working environments. However, if the require jet characteristics are achieve in a working environment, the resulting combined plasma stream 160 has the properties necessary for the plasma treatment.

In FIG. 3B, plasma burners 110 and 120 are at a relative angle A and at equal distances on opposite sides of injector 130. If jets 115 and 125 have a predetermined cross-section (or diameter d) and follow predetermined paths corresponding to the angle A, a height Hmin at which jets 115 and 125 begin to merge and the properties of the combined stream 190 are those necessary for a plasma treatment. As described further below, in some environments, plasma jets 115 and 125 do not follow the desired paths when burners 110 and 120 have the orientation and separation of FIG. 3. Accordingly, adjustments of the drive 160 or magnetic systems 151 and 152 may be required to return jets 115 and 125 to the paths that provide the desired combined stream 190.

FIG. 3B also illustrates the positions of cameras 142 and 144 relative to the jets 115, 125, and 135. Cameras 142 and 144 are particularly positioned to measure one or more characteristic of plasma jets 115 and 125 before jets 115 and 125 merge into combined plasma stream 190. In FIG. 3B, jets 125 and 135 are measured in an x-y plane that is distance H from where the centers of jets 115 and 125 merge. A suitable range for distance H is from distance Hmin where jets 115 and 125 begin to merge and therefore are difficult to measure separately to a distance Hmax where portions of equipment 100 (e.g., injector 130) interfere with measurement of jet 115 or 125. In the exemplary embodiment, cameras 142 and 144 determine locations where jets 115 and 125 cross the x-y plane, but measurement systems can also determine the diameter or cross-section of each beam in the x-y plane and spectral and/or intensity information for each beam.

Figure 4:
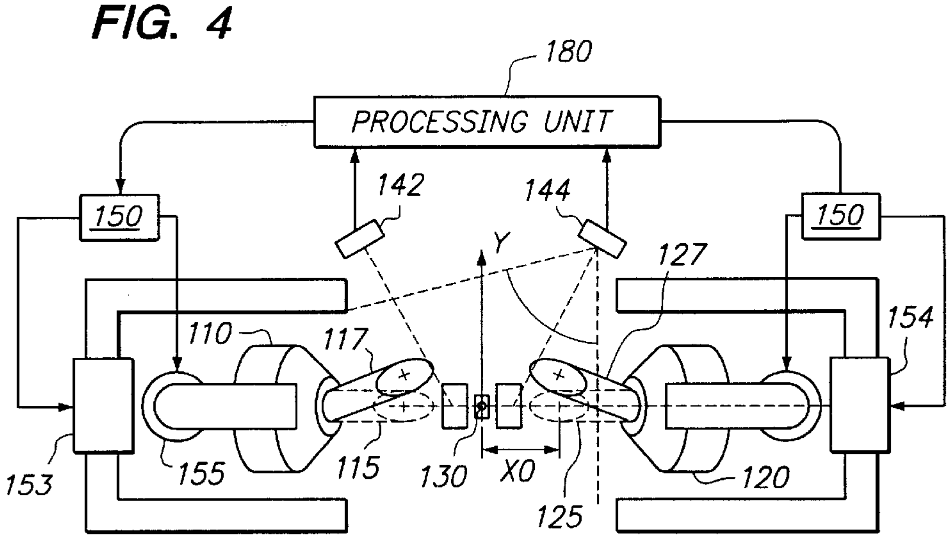
FIG. 4 is a top view of the plasma treatment system of FIG. 2 and illustrates adjustment plasma jets that initially follow errant paths.

FIG. 4 illustrates operation of the plasma treatment system 100 when plasma jets 117 and 127 from respective plasma burners 110 and 120 initially do not follow the desired paths of jets 115 and 125. Each of measurement systems 142 and 144 has a field of view that includes both plasma jets 117 and 127 and takes an image of both jets 117 and 127. From the image data, processing unit 180 determines the positions of the jets 117 and 127 when the jets cross the x-y plane. In the x-y co-ordinate system of the plane, the center of jet 117 and 127 ideally would be on the x-axis (i.e., have coordinate y equal to zero) and at a distance X0 from the center of injector 130. For adjusting the plasma jet 117 (or 127), magnetic circuits 151 (or 152) include a pair of solenoids 153 and 155 (or 154 and 156) that separately control magnetic fields that shift the crossing point of the beam 117 (or 127) in the x and y directions. After determining the positions of centers of jets 117 and 127, processing unit 180 directs power supply 150 to supply currents that shift the jets to the desired crossing point in the x-y plane. Once the jets are in the desired positions, processing unit 180 continues to monitor the plasma jets and continually adjusts the plasma jets as required to keep them in their optimal positions.

Figure 5:
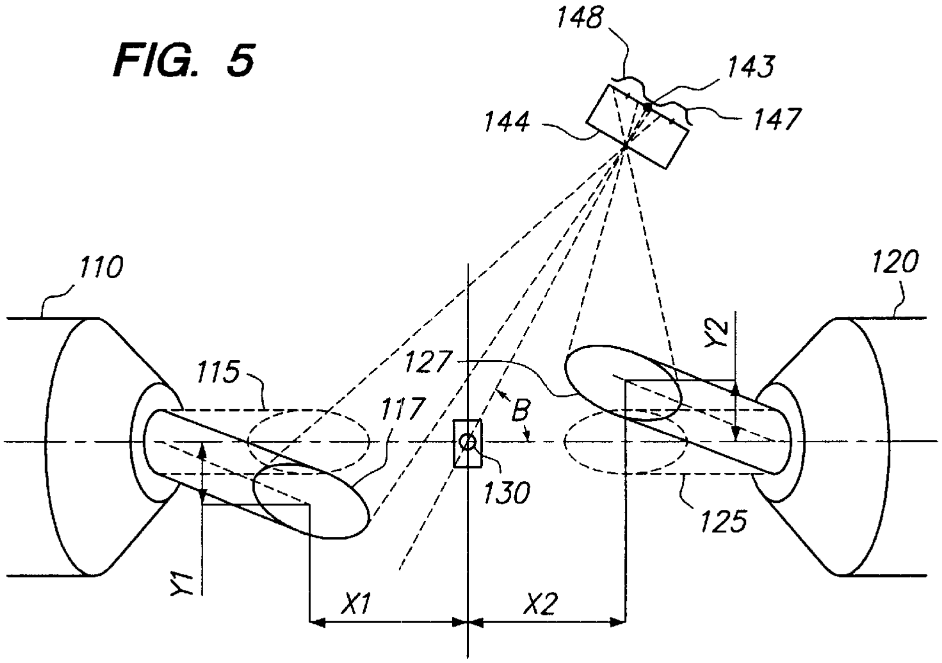
FIG. 5 illustrates separate measurement of two plasma jets using a single camera.

FIG. 5 further illustrates operation of an exemplary embodiment of the measurement system 140. In the exemplary embodiment of the invention, each camera 142 or 144 is an electronic camera (e.g., optics and a CCD array). The optics of each camera have a field of view including the x-y plane, and the CCD array can be a linear array of devices. In FIG. 5, a calibration point 143 along the CCD array corresponds to the position of injector 130 in the image in camera 144 as determined from use of a light fixture or direct observance of injector 130. When plasma burners 110 and 120 generate the plasma jets 117 and 127, the images of jets 117 and 127 move when the centers of jets 117 and 127 move in the x-y plane. However, camera 144 is positioned at distance and angle B relative to injector 130 such that through the entire expected range of motion of jet 117, the image 147 of jet 117 remains on the one side of the calibration point 143. Similarly, through the entire expected range of motion of jet 127, the image 148 of jet 127 remains on the other side of the calibration point 142. Accordingly, processing unit 180 can easily distinguish the image of plasma jet 117 from the image of plasma jet 127. The position of camera 142 is similarly limited to simplify identification of the separate jets in the image. The combination of the image data from measurement system 140 can thus locate the centers of the plasma jets in the x-y plane.

Figure 6:
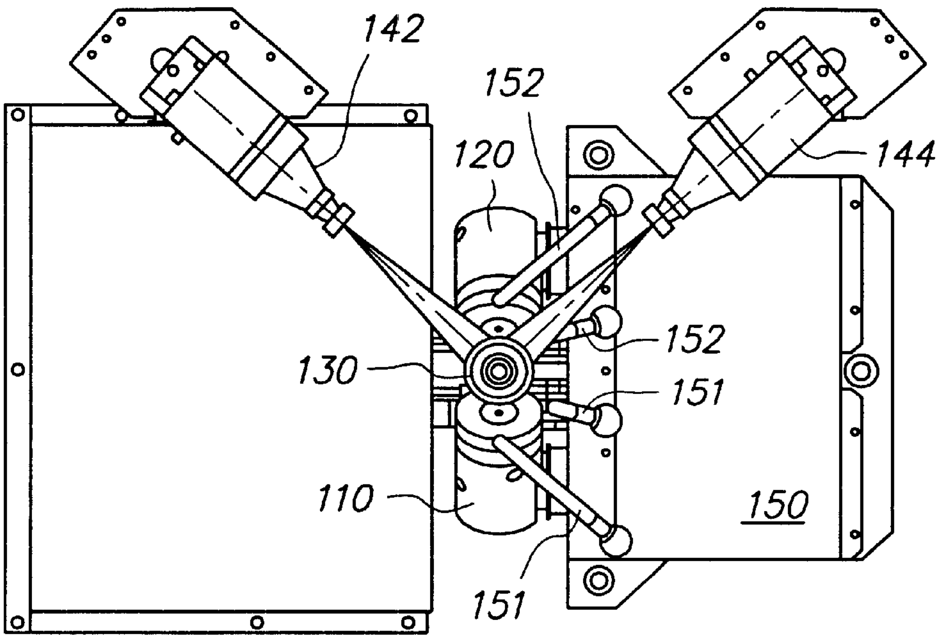
FIG. 6 is a top view of an embodiment of a plasma treatment system in accordance with an embodiment of the invention.

FIG. 6 shows another embodiment of the invention where two line-scan cameras 142 and 144 have fields of view centered on injector 130. The optical axes of cameras 142 and 144 are at a 90° angle. In this configuration, cameras 142 and 144 are on opposite sides of plasma burner 120. Other configurations of cameras 142 and 144 are possible. Alternatively, four cameras could be employed, with a pair of cameras separately measuring each jet. However, the embodiments described above using the same cameras for both plasma jets are simpler and less expensive.

Although the invention has been described with reference to particular embodiments, the description is only an example of the invention's application and should not be taken as a limitation. In particular, even though much of preceding discussion was aimed at plasma systems that combine two plasma jets into a combined flow, alternative embodiments of this invention include systems combining more than two jets. Various other adaptations and combinations of features of the embodiments disclosed are within the scope of the invention as defined by the following claims.

What is claimed is:

1. A method for operating a plasma apparatus, comprising:

(a) separately measuring a characteristic of a first plasma jet and a characteristic of a second plasma jet to obtain (i) a first value which is a measured value of the characteristic of the first plasma jet and (ii) a second value which is a measured value of the characteristic of the second plasma jet, wherein the first and second plasma jets converge into a combined plasma stream;

(b) using the first value, adjusting the first plasma jet so that the characteristic of the first plasma jet changes from the first value to a value previously determined; and (c) using the second value, adjusting the second plasma jet so that the characteristic of the second plasma jet changes from the second value to a value previously determined.

2. The method of claim 1, wherein:

separately measuring the characteristics of the first and second plasma jets comprises identifying locations of the first plasma jet and the second plasma jet;

adjusting the first plasma jet comprises shifting the first plasma jet from the measured location to a location previously determined; and adjusting the second plasma jet comprises shifting the second plasma jet from the measured location to a location previously determined.

3. The method of claim 2, wherein the locations of the first and second plasma jets are measured relative to a location of an injector that injects a cold jet into the combined plasma stream.

4. The method of claim 2 wherein the operation (a) is performed continually during a period of time in which a plasma treatment is performed, and the operation (b) and (c) are performed continually during said period of time to adjust the first and second plasma jets as required to keep the first and second plasma jets at their respective previously determined locations.

5. The method of claim 1, wherein measuring a characteristic of a first plasma jet comprises:

imaging the first plasma jet from a first perspective;

imaging the first plasma jet from a second perspective; and determining a first location of the first plasma jet using images at the first and second perspectives, the first location being the characteristic of the first plasma jet.

6. The method of claim 5, wherein measuring a characteristic of a second plasma jet comprises:

imaging the second plasma jet from a third perspective;

imaging the second plasma jet from a fourth perspective; and determining a second location of the second plasma jet using images at the third and four perspectives, the second location being the characteristic of the second plasma jet.

7. The method of claim 6, wherein the first and second locations are in a plane upstream of where the first and second plasma jets converge.

8. The method of claim 1, wherein separately measuring the characteristics of the first and second plasma jets comprises determining positions of the first and second jets relative to an injector that supplies a gas jet that combines with the first and second plasma jets in the combined stream.

9. The method of claim 1 wherein the operation (a) is performed continually during a period of time in which a plasma treatment is performed, and the operation (b) and (c) are performed continually during said period of time to adjust the first and second plasma jets as required to keep the characteristics of the first and second plasma jets at their respective values previously determined.

10. A method comprising plasma treatment, wherein the plasma treatment comprises:

(a) generating a plurality of plasma jets which are to converge into a combined plasma stream;

(b) for a first plasma jet which is one of the plurality of the plasma jets, measuring a first characteristic which is a characteristic of the first plasma jet upstream of where the first plasma jet converges with any other plasma jet, and obtaining a first value which is a measured value of the first characteristic;

(c) determining whether the first value is different from a predetermined value desired for the first characteristic, and whether the first plasma jet is to be adjusted to obtain said desired value;

(d) if the first plasma jet is to be adjusted to obtain the desired value, then adjusting the first plasma jet.

11. The method of claim 10, wherein:

measuring the first characteristic comprises identifying a location of the first plasma jet;

adjusting the first plasma jet comprises shifting the first plasma jet to a desired location.

12. The method of claim 11 wherein the operations (a), (b), (c), (d) are performed continually during at least part of the plasma treatment.

13. The method of claim 11, wherein the location of the first plasma jet is measured relative to a location of an injector that injects a non-plasma substance into the combined plasma stream.

14. The method of claim 10 wherein the plasma treatment further comprises:

(e) for a second plasma jet which is one of the plurality of the plasma jets, measuring a second characteristic which is a characteristic of the second plasma jet upstream of where the second plasma jet converges with any other plasma jet, and obtaining a second value which is a measured value of the second characteristic;

(f) determining whether the second value is different from a predetermined value desired for the second characteristic, and whether the second plasma jet is to be adjusted to obtain said desired value for the second characteristic;

(g) if the second plasma jet is to be adjusted to obtain the desired value for the second characteristic, then adjusting the second plasma jet.

15. The method of claim 14, wherein:

measuring the first characteristic comprises identifying a location of the first plasma jet;

adjusting the first plasma jet comprises shifting the first plasma jet to a desired location;

measuring the second characteristic comprises identifying a location of the second plasma jet;

adjusting the second plasma jet comprises shifting the second plasma jet to a desired location.

16. The method of claim 15 wherein the operations (a) through (g) are performed continually during at least part of the plasma treatment.

17. A method comprising plasma treatment, wherein the plasma treatment comprises:

generating a plurality of plasma jets which are to converge into a combined plasma stream;

for each given plasma jet of said plurality:

measuring a predefined characteristic which is a characteristic of the given plasma jet upstream of where the given plasma jet converges with any other plasma jet, and obtaining a value which is a measured value of the predefined characteristic;

determining whether the measured value of the predefined characteristic is different from a predetermined value desired for the predefined characteristic, and whether the given plasma jet is to be adjusted to obtain said desired value of the predefined characteristic;

if the given plasma jet is to be adjusted to obtain the desired value of the predefined characteristic, then adjusting the given plasma jet.

* * * * *